United States Patent
Newton et al.

(10) Patent No.: US 9,220,147 B2
(45) Date of Patent: Dec. 22, 2015

(54) LUMINAIRE WITH A SENSOR THAT VARIES ITS ACTIVATION IN RESPONSE TO THE PRESENCE OR ABSENCE OF OBJECTS

(71) Applicant: KONINKLIJKE PHILIPS N.V., Eindhoven (NL)

(72) Inventors: Philip Steven Newton, Eindhoven (NL); Bart Kroon, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/362,212

(22) PCT Filed: Dec. 5, 2012

(86) PCT No.: PCT/IB2012/056979
§ 371 (c)(1),
(2) Date: Jun. 2, 2014

(87) PCT Pub. No.: WO2013/084158
PCT Pub. Date: Jun. 13, 2013

(65) Prior Publication Data
US 2014/0354179 A1  Dec. 4, 2014

Related U.S. Application Data
(60) Provisional application No. 61/568,193, filed on Dec. 8, 2011.

(51) Int. Cl.
H05B 37/02 (2006.01)
H05B 33/08 (2006.01)

(52) U.S. Cl.
CPC ........ H05B 33/0854 (2013.01); H05B 37/0227 (2013.01); *Y02B 20/44* (2013.01)

(58) Field of Classification Search
None
See application file for complete search history.

(56) References Cited

U.S. PATENT DOCUMENTS

2006/0023461 A1 *   2/2006   Knight .......................... 362/466
2006/0044800 A1     3/2006   Reime
2009/0251070 A1 *  10/2009   Petzl et al. .................... 315/297
2010/0301767 A1    12/2010   Van De Sluis et al.

FOREIGN PATENT DOCUMENTS

| EP | 1408276 A2 | 4/2004 |
|---|---|---|
| WO | 2008135942 A1 | 11/2008 |
| WO | WO 2008135942 A1 * | 11/2008 |
| WO | 2010070520 A1 | 6/2010 |
| WO | 2011057313 A1 | 5/2011 |

* cited by examiner

*Primary Examiner* — Douglas W Owens
*Assistant Examiner* — Dedei K Hammond
(74) *Attorney, Agent, or Firm* — Meenakshy Chakravorty

(57) ABSTRACT

A luminaire (1a, 1b) and a method for controlling a luminaire are disclosed. The luminaire (1a, 1b) comprises a light source (2) and an ultrasonic sensor (3). The ultrasonic sensor (3) detects the presence and direction of movement of a person (4) with respect to the light source (2). A controller modifies a lighting parameter emitted from the light source (2) depending on whether a person (4) is moving towards or away from the light source (2).

10 Claims, 3 Drawing Sheets

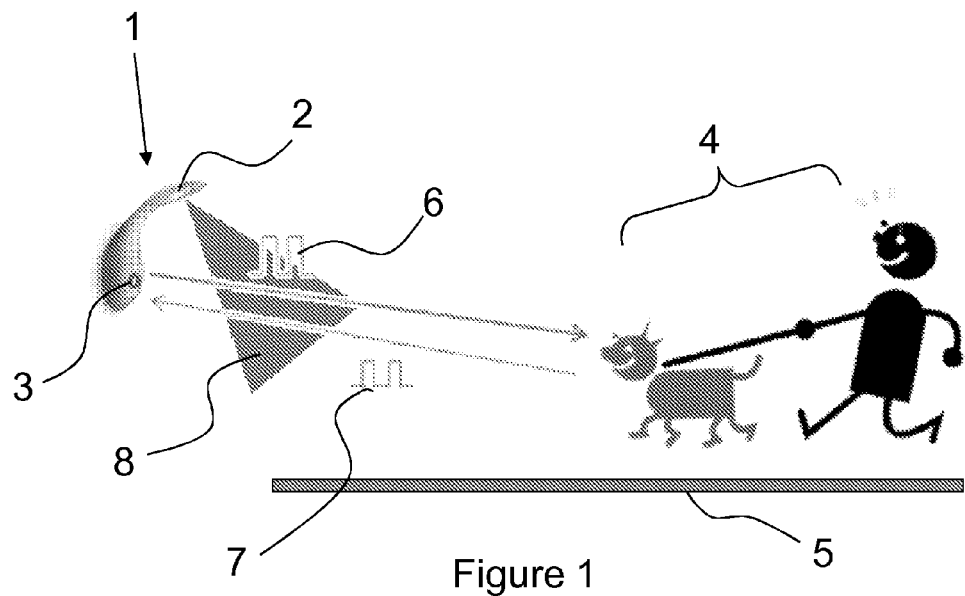
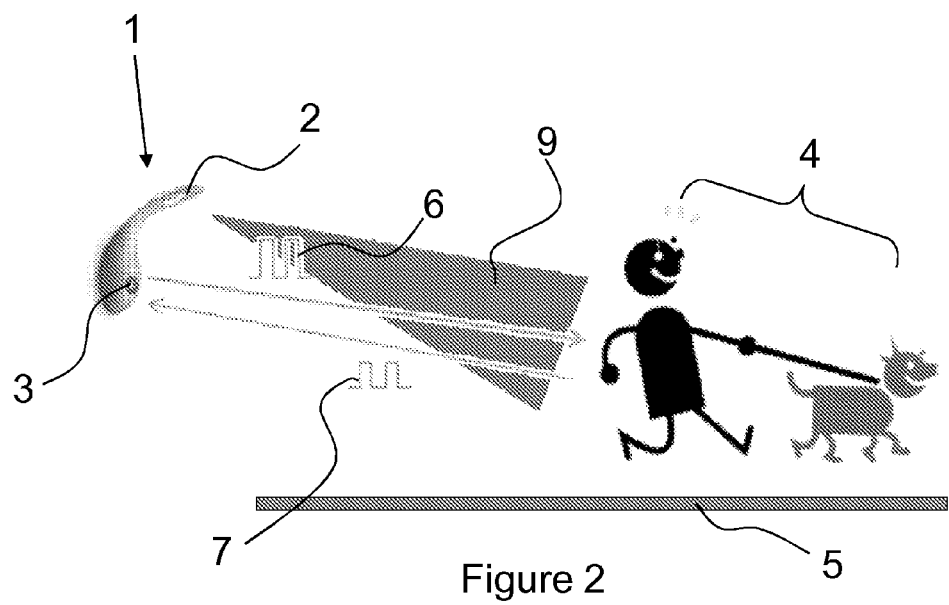

LUMINAIRE WITH A SENSOR THAT VARIES ITS ACTIVATION IN RESPONSE TO THE PRESENCE OR ABSENCE OF OBJECTS

CROSS-REFERENCE TO PRIOR APPLICATIONS

This application is the U.S. National Phase application under 35 U.S.C. §371 of International Application No. PCT/IB2012/056979, filed on Dec. 5, 2012, which claims the benefit of [e.g., U.S. Provisional Patent Application No. or European Patent Application No.] 61/568,193, filed on Dec. 8, 2011. These applications are hereby incorporated by reference herein.

FIELD OF THE INVENTION

This invention relates to a luminaire that activates in response to the presence of a person detected within a detection zone, such as a path or driveway.

BACKGROUND OF THE INVENTION

Wall mounted luminaires or lights for illuminating outdoor areas are often equipped with a motion detector that switches on a lamp when movement is detected. The detector is commonly an infrared sensor that detects infrared emissions radiated by a body, but they may also be ultrasound sensors that emit a high frequency wave pulse and listen to the echo to detect any physical changes in the environment. In either case, the principle is to detect the presence of a person and automatically activate a light to illuminate an area so that the person can see their surroundings or so that others are made aware of their presence, if the light is being used for security purposes.

A common problem is that it is difficult to effectively position these lamps to light the required area, such as a pathway or courtyard, without shining light directly towards and into the eyes of a person when they are walking towards the light. Although the light can be positioned or orientated so that it does not shine directly into the eyes of an approaching person, it may then not effectively illuminate the required area.

It is known from EP 1,408,276 A2 to provide a system with a plurality of light sources and sensors that determine the position of a person. The light sources are controlled so as to generate maximum illumination at the person's location.

It is known from U.S. 2010/0301767 A1 to provide an interactive lighting system for a clothing rack in which the lighting is controlled in dependence on the distance of a person from the rack.

SUMMARY OF THE INVENTION

According to the invention, there is provided a luminaire comprising a light source, a sensor and a controller. The controller is configured to modify a lighting parameter of the light source differently depending on whether the sensor detects movement of a person towards, or away from, the light source.

In a preferred embodiment, the light source comprises a plurality of light emitting elements, the controller being configured to control at least some of said light emitting elements to modify the lighting parameter when the sensor detects movement of a person towards the light source. This is to prevent the vision of a person facing the light source from being impaired due to glare or excessive light being shined directly into their eyes.

The controller may be configured to modify the lighting parameter by deactivating some of said light emitting elements when the sensor detects movement of a person towards the light source. Deactivating some of the light emitting elements is a simple way of reducing the intensity of the light without having to control power levels.

The controller may be configured to change the number of light emitting elements that are deactivated in dependence on the distance of the person from the light source. Therefore, the number of lights that are deactivated can be greater when a person is closer to the light source, relative to when they are further away from it, and when the light emitted from the light source is more likely to cause irritation.

The controller may be configured to reduce the power supplied to at least some of said light emitting elements when the sensor detects movement of a person towards the light source. Rather, or in addition to deactivating light emitting elements, it may be preferable to simply reduce the power levels supplied to some or all them.

The controller may be configured to vary the power supplied to at least some of said light emitting elements in dependence on the distance of the person from the light source. Consequently, a greater power reduction may be employed when a person is closer to the light emitting elements so as to minimize glare.

Preferably, the luminaire includes a lens positioned in front of some of said light emitting elements to direct light emitted by said light emitting elements in a different direction to the direction in which light is directed by other light sources. This allows light to be directed in different directions, i.e. light that is directed through the lens may be focused in a particular direction.

According to a further embodiment, light emitting elements behind the lens are activated by the controller when the sensor detects that a person is approaching the light source, said lens being configured to direct a light emitted by said light emitting elements in a downward direction relative to the light emitted by said other light emitting elements that are deactivated by the controller when the sensor detects a person approaching the light source.

Another embodiment comprises a reflector positioned to direct light emitted from said light emitting elements behind the lens in a direction towards said lens. The reflector prevents stray light from light emitted by the elements behind the lens from bypassing the lens.

In another embodiment, the lens is a first lens and the other light sources are located behind at least one further lens, the or each further lens being operable to direct the spread of light emitted from said other light emitting elements in a selected direction when said other light sources are illuminated. The lenses may direct or focus the light in different directions and so the light may be controlled by activating or deactivating the light emitting elements behind one or more of the lenses.

A baffle may be positioned in front of some of the light emitting elements, the controller being configured to deactivate all of the light emitting elements apart from those behind the baffle when the sensor detects that a person is approaching the light source. The baffle directs light that would otherwise cause glare to a person approaching the light in a direction away from the person.

According to one embodiment the controller is configured to illuminate all the light emitting elements when the sensor detects that the person is moving away from the light source. If the person is moving away from the light source the light will not be shining directly in their eyes, so all the light emitting elements can be activated in this instance. The light emitting elements may comprise LED's. As these are small and low-powered, a number of LED's can be easily incorporated within a single luminaire housing. The sensor may be an ultrasonic sensor.

Furthermore, according to the invention, there is provided a method of controlling a luminaire which comprises a light source, a sensor and a controller. The method including the step of configuring the controller to modify a lighting parameter of the light source differently depending on whether the sensor detects movement of a person towards, or away from, the light source.

BRIEF DESCRIPTION OF THE DRAWINGS

Preferred embodiments will now be described, by way of example only, with reference to the accompanying drawings, in which:

FIG. 1 shows a schematic diagram of the invention.

FIG. 2 shows a schematic diagram of the invention of FIG. 1.

DETAILED DESCRIPTION

Figure 3:
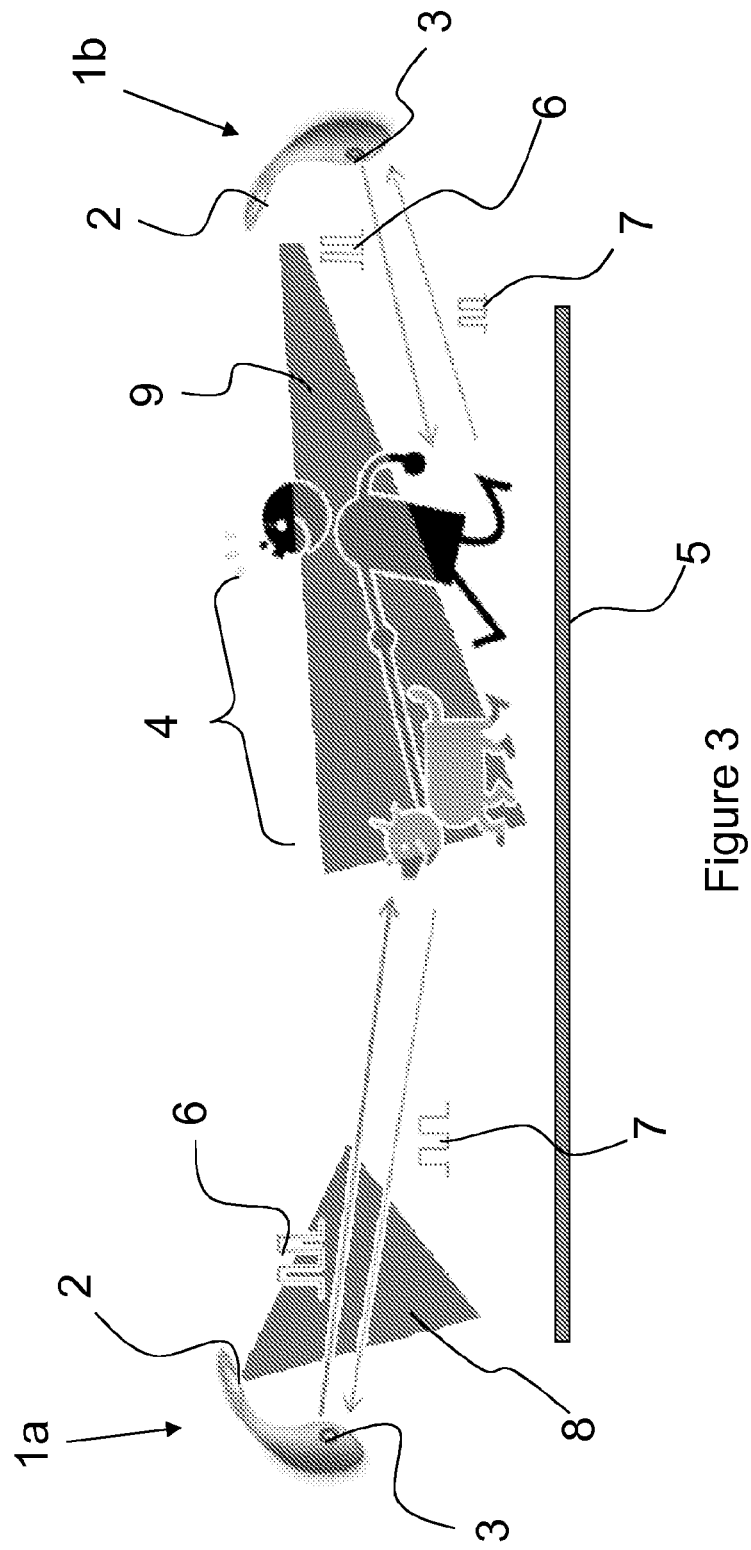
FIG. 3 shows a schematic diagram of the invention of FIGS. 1 and 2, with multiple luminaires being deployed simultaneously.

It is known in the art to use ultrasonic sensors to measure a distance; a piezoelectric transducer releases an ultrasonic wave pulse of a controlled duration and frequency and then a sensor will detect any echo waves that are returned. The transducer may be the sensor; however, if the transducer and sensor are separate components then they must be located proximate to each other in order to obtain accurate measurements. The echo waves are the ultrasonic waves emitted by the transducer that have been reflected back from any objects to the sensor. The sensor is configured to time the difference between the emission of the wave and detecting the echo wave. This time, combined with knowledge of the speed of the wave in air, allows the distance from the sensor to the object to be determined. A suitable ultrasonic wave pulse might be about 20 pulses at a frequency of 40 kHz. Ultrasonic sensors of this type are well known in the art and do not form a part of this invention. For this reason, further detailed description is not included.

Referring to the drawings, FIGS. 1 and 2 show schematic diagrams of the luminaire 1 which comprises a variable light source 2 and an ultrasonic sensor 3. A moving object 4 is also shown, in this case, a person walking their dog.

FIG. 1 shows the luminaire 1 as the person and their dog 4 are moving towards the light source 2 and sensor 3. The ultrasonic sensor 3 is directed towards a lighting zone 5 and emits ultrasonic wave pulses 6 and then listens for changes in the reflected echo waves 7, indicating a moving object 4, and monitors the distance from the sensor 3 to the moving object 4. This allows the luminaire 1 to determine the direction of movement of the person 4.

Once the direction of movement has been determined, a controller then modifies a lighting parameter of the light source 2 so that illumination in the light zone 5 is more suitable for the person 4 moving towards the light source 2. For example, the lighting parameter might be the direction of the light. In this case, the light 8 is directed downwards into the forward path of the person 4. Alternatively, the lighting parameter might be the intensity of the light 8, which is reduced when the person 4 is moving towards the light source 2 so that the light 8 is not shining directly into the person's eyes, which may stun or impair their vision. Directing the light 8 into the path of the person 4 instead of directly at the person 4 will enable them to see more clearly where they are going without the glare or blinding effect of a light shining at their face.

When multiple persons and/or objects approach or move away from the luminaire the controller will direct the light based on the person that is closest to the luminaire.

The luminaire of the invention uses a plurality of LED's as light sources and the intensity of the light may be reduced by switching off certain LED's. Furthermore, the direction of the light may be altered by illuminating LED's that are positioned behind a lens that will re-direct the light in an appropriate direction, i.e. downwardly towards the feet of an approaching person instead of upwardly towards their face. Furthermore the direction of the light may be altered by using a plurality of LED's with a light collimating element positioned behind a lens, whereby the direction is changed by switching several LED's on or off. Alternatively, the position of the lens may be controlled through mechanical means, such as an electric actuator.

FIG. 2 shows the luminaire 1 and the person 4 moving away from the light source 2 and sensor 3. The ultrasonic sensor 3 will detect that the distance to the moving object 4 is increasing and the system 1 will deduce that the person 4 is moving away from the light source 2. The lighting parameter, i.e. the direction and/or intensity of the light 9, is then modified by the controller so that the area around the person 4 is more effectively illuminated. In this case, the light 9 may be directed towards the person 4 and may have a greater intensity, because they are facing the other way and will not be adversely affected by increasing the light incident on them. This will illuminate the area around the person 4 and possibly the path in front of them.

FIG. 3 shows how multiple luminaires 1 may be used to more effectively cover a large lighting zone 5. A first luminaire 1a and a second luminaire 1b are shown in FIG. 3 and are the same as those described with reference to FIGS. 1 and 2. In this case, the first and second luminaires 1a, 1b are positioned opposite each other. As the person 4 moves towards the first luminaire 1a (right to left as depicted in the drawing), the first luminaire 1a directs the light 8 downwards, not directly at the person 4, while the second luminaire 1b directs the light 9 towards the person 4 to illuminate the area directly around the person 4. In this way, the path in front of and the area around the person 4 are illuminated. If the person 4 were to move in the opposite direction, towards the second luminaire 1b, the systems would reverse their lighting directions. An advantage of this invention is that the light is directed in an optimal way using multiple luminaires without requiring any direct communication between the luminaires.

Figure 4:
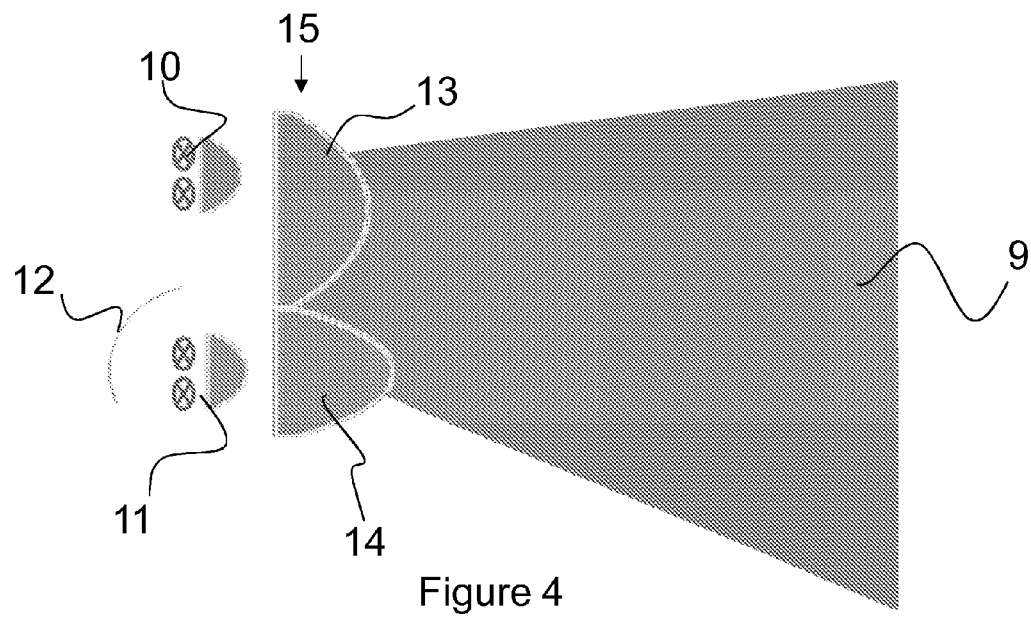
FIG. 4 shows a schematic diagram of the light source of FIGS. 1 to 3.
Figure 5:
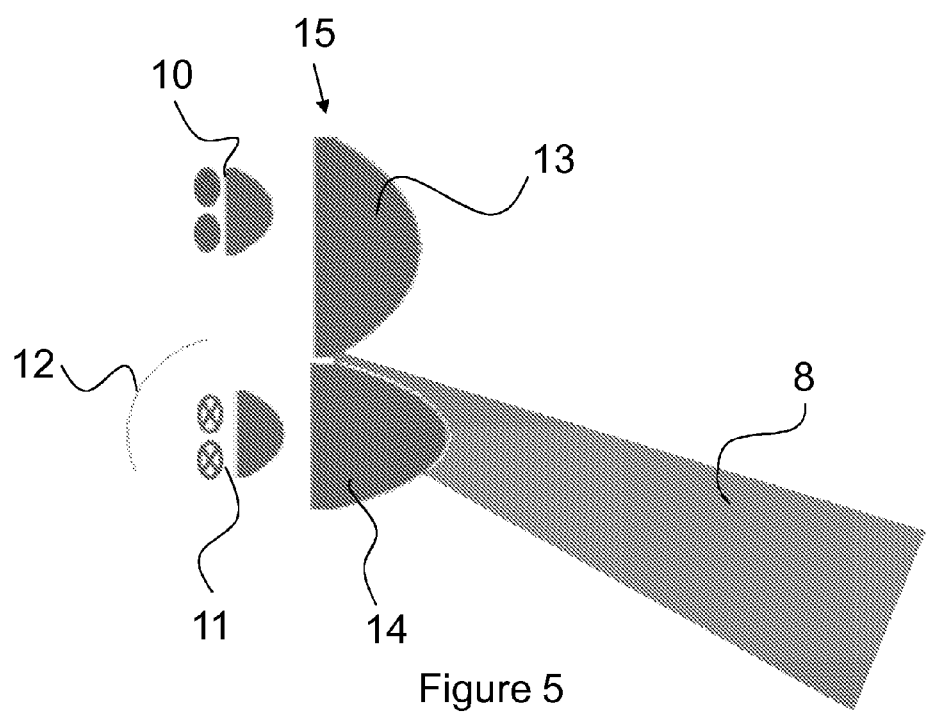
FIG. 5 shows another schematic diagram of the light source of FIG. 4.

FIGS. 4 and 5 show schematic diagrams of the light source 2 that can adjust the direction in which light is emitted. The light source 2 comprises a first LED module 10 and a second LED module 11, a light directing foil 15 and a reflector 12. The LED modules 10 and 11 may consist of one or multiple LED's with one or multiple light collimating elements. The one or multiple LEDs in the modules may individually be controlled by the controller. The light directing foil 15 comprises a wide angle lens 13 and a narrow angle lens 14 and the first and second LED modules 10, 11 are positioned adjacent to these lenses 13, 14. Light from the first LED module 10 is primarily directed towards the wide angle lens 13 and the light from the second LED module 11 is primarily directed towards the narrow angle lens 14. The first LED module 10 and the wide angle lens 13 are positioned above the second LED module 11 and the narrow angle lens 14. The reflector 12 is positioned behind and above the second LED module 11 to prevent light from the second LED module 11 from reaching the wide angle lens 13.

FIG. 4 shows the light source 2 in the condition implemented when the person 4 is moving away from the light source 2 and sensor 3. The first and second LED modules 10, 11 are illuminated and the light director 15 directs the light 9 in the required direction. The wide angle lens 13 directs light from the first LED module 10 over the entire the lighting area 5. The narrow angle lens 14, positioned underneath the wide angle lens 13, directs light from the second LED module 11 towards the ground in front of the light source 2.

FIG. 5 shows the light source 2 when the moving object 4 is moving towards the light source 2 and sensor 3. The first LED module 10, corresponding to the wide angle lens 13, is turned off and the second LED module 11 is turned on. Light 8 passes through the narrow angle lens 14 which directs the light 8 at an angle, towards the area in front of the light source 2, in the forward path of the moving object 4.

The ultrasonic sensor 3 is used to detect the presence of a moving object 4 and to determine the direction of movement of that object 4, with respect to the light source 2. This allows the light source 2 to be configured appropriately. If no moving object 4 is detected in a predetermined time, the light source 2 will be switched off.

In the embodiments described above the light source is configured to adjust the direction of the emitted light depending the direction of movement of a person in the light zone. However, the light source may also, or instead, be configured to alter the intensity and/or color of the emitted light. The light intensity could be reduced when a person moves towards the light source to prevent their vision being impaired. Also, changing the color of the emitted light may reduce the glare or visual impairment of the person.

The luminaires 1 described with reference to FIGS. 1 to 5 comprise two light settings, suitable for an object 4 moving towards or away from the light source 2. It may be possible to implement a similar system with more LED modules and more lenses that can direct light in more than two directions. The ultrasonic sensor can measure the distance between the sensor and the object as well as the direction of movement of the object and so is able to control the light source to accurately direct light towards the moving object. Additional control software and high specification ultrasonic sensors can be used if required.

The embodiments described above comprise a light source 2 and a sensor 3 located in the same place. This is not necessary; so long as the system is configured or calibrated during installation, the light source and sensor may be located in different places.

The lenses of the luminaire may be configured to direct light in different directions for lighting zones in which objects may not move towards and away from the light source. For example, if the luminaire were used on a side wall of a narrow path the sensor may be directed in a perpendicular direction to detect objects moving along the path and the light source can then be configured to alter the light that is emitted in a lateral direction across the path.

It is envisaged that the detection of movement towards or away from a sensor can also be used to illuminate other lamps in a lighting system. For example, when it is determined that a person is moving away from the sensor, other lamps may be illuminated in front of them so that they are not solely lit from behind and so that they are not walking in their own shadow. Low-level path lighting could also be illuminated in a particular direction as a result of the detection of movement towards or away from the sensor, in addition to controlling the light intensity and/or direction of light emitted from the primary light source.

A baffle may be positioned in front of an LED module to reduce the intensity of the light being emitted from that LED module without having to adjust the power supply. In this way, the controller will turn off those light sources that are not located behind a baffle when the object is moving towards the light source.

It will be appreciated that the term "comprising" does not exclude other elements or steps and that the indefinite article "a" or "an" does not exclude a plurality. The mere fact that certain measures are recited in mutually different dependent claims does not indicate that a combination of these measures cannot be used to an advantage. Any reference signs in the claims should not be construed as limiting the scope of the claims.

Although claims have been formulated in this application to particular combinations of features, it should be understood that the scope of the disclosure of the present invention also includes any novel features or any novel combinations of features disclosed herein either explicitly or implicitly or any generalization thereof, whether or not it relates to the same invention as presently claimed in any claim and whether or not it mitigates any or all of the same technical problems as does the parent invention. The applicants hereby give notice that new claims may be formulated to such features and/or combinations of features during the prosecution of the present application or of any further application derived there from.

Other modifications and variations falling within the scope of the claims hereinafter will be evident to those skilled in the art.

The invention claimed is:

1. A luminaire comprising a light source, a sensor and a controller, the light source comprising a first LED module for primarily directing light towards a wide angle lens, and a second LED module for primarily directing light towards a narrow angle lens, wherein each LED module comprises one or more light emitting elements; wherein the narrow angle lens is arranged to direct light emitted by the second LED module in a downward direction relative to the direction in which light emitted by the first LED module is directed by the wide angle lens, the controller being configured to control the first and second LED modules to modify a lighting parameter of the light source differently depending on whether the sensor detects movement of an object towards, or away from, the light source, wherein, when the sensor detects that an object is moving away from the luminaire, at least the first LED module is activated by the controller, and wherein, when the sensor detects that an object is moving towards the luminaire, the first LED module is deactivated by the controller and the second LED module is activated by the controller.

2. A luminaire according to claim 1, wherein the controller is configured to change the number of said light emitting elements that are deactivated in dependence on distance of a person from the light source.

3. A luminaire according to claim 1, wherein the controller is configured to reduce the power supplied to at least some of said light emitting elements when the sensor detects movement of a person towards the light source.

4. A luminaire according to claim 3, wherein the controller is configured to vary the power supplied to at least some of said light emitting elements in dependence on the distance of the person from the light source.

5. A luminaire according to claim 1, comprising a reflector positioned to direct light emitted from said light emitting elements behind the lens in a direction towards said lens.

6. A luminaire according to claim 5, wherein the lens is a first lens and the other light sources said light emitting elements are located behind at least one further lens, the at least one further lens being operable to direct the spread of light emitted from said other light emitting elements in a selected direction when said said light emitting elements are illuminated.

7. A luminaire according to claim 1, comprising a baffle positioned in front of some of the said light emitting elements, the controller being configured to deactivate all of the said light emitting elements apart from those behind the baffle when the sensor detects that a person is approaching the light source.

8. A luminaire according to claim 1, wherein the controller is configured to illuminate all of the said light emitting elements when the sensor detects that the person is moving away from the light source.

9. A luminaire according to claim 1, wherein the said light emitting elements comprise LED's.

10. A luminaire according to claim 1, wherein the sensor is an ultrasonic sensor.

* * * * *